United States Patent
Suzuki

(10) Patent No.: US 6,286,065 B1
(45) Date of Patent: Sep. 4, 2001

(54) MICROCOMPUTER HAVING A BUILT-IN A/D CONVERTER WITH A RESISTOR BETWEEN AN EXTERNAL TERMINAL AND AN I/O CIRCUIT

(75) Inventor: Hideyuki Suzuki, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/193,847

(22) Filed: Nov. 18, 1998

(30) Foreign Application Priority Data

Nov. 18, 1997 (JP) ..................................... 9-317028

(51) Int. Cl.[7] ..................................... G06F 15/78
(52) U.S. Cl. ............................. 710/69; 341/144; 341/155
(58) Field of Search ................ 710/65–71; 341/144–158

(56) References Cited

U.S. PATENT DOCUMENTS

| | | | |
|---|---|---|---|
| Re. 35,197 | 4/1996 | Baba | 395/800 |
| 4,607,274 * | 8/1986 | Yoshitake | 257/357 |
| 4,875,047 | 10/1989 | Baba | 341/155 |
| 4,935,649 * | 6/1990 | Bloker | 327/51 |
| 4,965,577 | 10/1990 | Baba | 341/141 |
| 5,014,054 * | 5/1991 | Oshita et al. | 341/145 |
| 5,066,858 * | 11/1991 | Elings et al. | 250/307 |
| 5,432,949 | 7/1995 | Baba | 395/800 |
| 5,917,385 * | 6/1999 | Sjogren | 333/81 |
| 6,029,007 | 2/2000 | Baba | 395/800 |
| 6,054,907 * | 4/2000 | Sjogren | 333/161 |
| 6,139,131 * | 10/2000 | Prasad et al. | 347/63 |
| 6,169,764 * | 1/2001 | Babanezhad | 375/233 |

FOREIGN PATENT DOCUMENTS

| | | | |
|---|---|---|---|
| 56-116147 | 9/1981 | (JP) . | |
| 58-50765 | 3/1983 | (JP) . | |
| 6219051 * | 9/1987 | (JP) | 257/363 |
| 63-45667 | 2/1988 | (JP) . | |
| 2-125380 | 5/1990 | (JP) . | |
| 2-234259 | 9/1990 | (JP) . | |
| 2-255993 | 10/1990 | (JP) . | |
| 5-83113 | 4/1993 | (JP) . | |

\* cited by examiner

*Primary Examiner*—Christopher B. Shin
(74) *Attorney, Agent, or Firm*—Foley & Lardner

(57) ABSTRACT

The present invention provides a microcomputer having a built-in A/D converter circuit and sharing an external terminal with an input terminal of the A/D converter so as to reduce the size and weight of the semiconductor integrated circuit, wherein a resistor is inserted to eliminate deterioration of the A/D converter circuit due to the reduction in the number of the terminals.

6 Claims, 3 Drawing Sheets

MICROCOMPUTER HAVING A BUILT-IN A/D CONVERTER WITH A RESISTOR BETWEEN AN EXTERNAL TERMINAL AND AN I/O CIRCUIT

BACKGROUND OF THE INVENTION

1. Field of the Invention

The present invention relates to a microcomputer and in particular, to a microcomputer having a built-in A/D converter circuit.

2. Description of the Related Art

FIG. 5 is a block diagram showing a configuration of such a microcomputer of a conventional type. As shown in FIG. 5, this conventional microcomputer includes: a data processor circuit block 2; an A/D converter circuit block 3; an I/O circuit 1 having a P channel MOS transistor 8, an N channel MOS transistor 9, and a NAND circuit 10; and an external terminal 11. A wiring connecting the external terminal 11 to the I/O circuit 1 and to the A/D converter circuit block 3 has wire resistances, i.e., parasitic resistances explicitly depicted as 4, 5, and 7. It should be noted that this is an example of a microcomputer that has reduced the number of terminals by sharing a single terminal as the external terminal used during a normal operation of the microcomputer and as an input terminal of the A/D converter circuit block during an A/D conversion operation.

In FIG. 5, when the microcomputer executes a normal processing operation in response to a data signal from the external terminal 11, the data processor circuit block 2 outputs control signals 101 and 102 either at "H" or "L" level for supply to corresponding gates of the P channel MOS transistor 8 and the N channel MOS transistor 9, respectively. Moreover, the data processor circuit block 2 outputs an input control signal 103 which is supplied when at "L" level to the NAND circuit 10. In this state, a data signal from the external terminal 11 is supplied to the NAND circuit 10 while affected by the ON/OFF operation state of the P channel MOS transistor 8 and the N channel MOS transistor 9. In the NAND circuit 10, the data signal is AND-ed with the input control signal 103 at "L" level and a resultant signal is supplied as an LSI input signal 104 to the data processor circuit block 2, where a predetermined processing is executed corresponding to the data signal supplied from the external terminal 11.

Moreover, when the microcomputer executes an A/D conversion, the data processor circuit block 2 outputs a control signal 101 at "H" level and a control signal 102 at "L" level. Upon reception of these control signals 101 and 102, the P channel MOS transistor 8 and the N channel MOS transistor 9 both enter the OFF state. Moreover, the data processor circuit block 2 outputs the input control signal 103 at "H" level for supply to the NAND circuit 104. In this state, a data signal from the external terminal 11 to be subjected to an A/D conversion is cut off by a circuit formed by the P channel MOS transistor 8 and the N channel MOS transistor 9, whereas an input impedance of the NAND circuit 10 is in an open state. Accordingly, the data signal from the external terminal 11 to be subjected to the A/D conversion passes through the parasitic resistances 4 and 7 to reach the A/D converter circuit block 3 so as to be subjected to a predetermined A/D conversion. Here, as has been described above, the input control signal 103 from the data processor circuit block 2 is supplied as "H" level to the NAND circuit 104. Accordingly, the data signal supplied via the parasitic resistances 4 and 5 is AND-ed in the NAND circuit 10, which outputs an LSI input signal 104 always at "L" level when supplied to the data processor circuit block 2. It should be noted that during this A/D conversion, if no off-leak current is generated in the I/O circuit 1, no leak current is generated at the input side of the A/D converter circuit block 3 which is connected to a capacitor via an A/D conversion switching transfer gate (not depicted). Consequently, no leak current is generated at the input side of the A/D converter circuit block, and regardless of values of the parasitic resistances 4 and 7, a potential of a data signal at the node B in FIG. 5 is at a level identical to the input potential to the external terminal 11. Thus, regardless of presence or absence of parasitic resistances, a data signal is applied to the A/D converter circuit block 3 without any level loss.

In the aforementioned conventional microcomputer sharing the single external terminal with an input terminal of the A/D converter circuit block, with increase in the integration of the semiconductor integrated circuit constituting the microcomputer, it has become impossible to arrange the I/O circuit at a sufficient distance from various noise sources. Accordingly, a noise generated from such a noise source causes a level fluctuation of the gates of the P channel MOS transistor 8 and the N channel MOS transistor 9, which in turn generates an off-leak current in the I/O circuit 1. Because of the parasitic resistance 4, the off-leak current causes a level fluctuation of a data signal inputted to the A/D converter circuit block from the external terminal. Suppose Vi is a voltage level of a data signal supplied to the external terminal 11; r4 and r5 are values of the parasitic resistances 4 and 5; and α is a voltage fluctuation value at the node A caused by an off-leak current of the I/O circuit 1. For the voltage level $V_i$ of the data signal supplied to the external terminal 11, the data signal at the node B of the input terminal of the A/D converter circuit block 3 has a potential level $V_B$ that can be expressed as follows.

$$V_B = V_i + \alpha[r4/(r4+r5)] \quad (1)$$

Accordingly, the potential level $V_B$ of the data signal supplied to the A/D converter circuit block 3, as shown above in the Equation (1), fluctuates according to the voltage fluctuation caused by the off-leak current in the I/O circuit 1 and the resistance value of the parasitic resistances 4 and 5. This significantly deteriorates the A/D conversion accuracy.

SUMMARY OF THE INVENTION

It is therefore an object of the present invention to provide a microcomputer having a built-in A/D converter circuit and sharing an external terminal with an input terminal of the A/D converter so as to reduce the number of necessary terminals, enabling to reduce the size and weight of the semiconductor integrated circuit while eliminating deterioration of the A/D converter circuit due to the reduction in the number of the terminals.

The microcomputer according to the present invention comprises: an internal circuit having a data processing function; a built-in A/D converter circuit connected to the internal circuit; an I/O circuit connected to the internal circuit; an external terminal for input/output shared by an input terminal of the A/D converter circuit;

a first branch wire connecting the external terminal via the I/O circuit to the internal circuit; a second branch wire connecting the external terminal to the A/D converter circuit, and a resistor inserted on the first branch wire connecting the external terminal to the I/O circuit and having a sufficiently higher resistance than a parasitic resistance of the first branch wire.

It should be noted that a main wire may be provided between the external terminal and a branching point of the first branch wire and the second branch wire.

The I/O circuit may include: a first-conductive field effect transistor (FET) having a source connected to a high-potential power source, a gate supplied with a first control signal from the internal circuit, and a drain connected to a terminal of the predetermined resistor; a second-conductive field effect transistor (FET) having a drain connected to the drain of the first-conductive FET, a gate supplied with a second control signal form the internal circuit, and a source connected to a low-potential power source; and a NAND circuit having a first input terminal connected to the terminal of the predetermined resistor, a second input terminal supplied with an input control signal from the internal circuit, and an output terminal connected to the internal circuit.

DESCRIPTION OF THE PREFERRED EMBODIMENTS

Description will now be directed to embodiments of the present invention with reference to the attached drawings.

Figure 1:
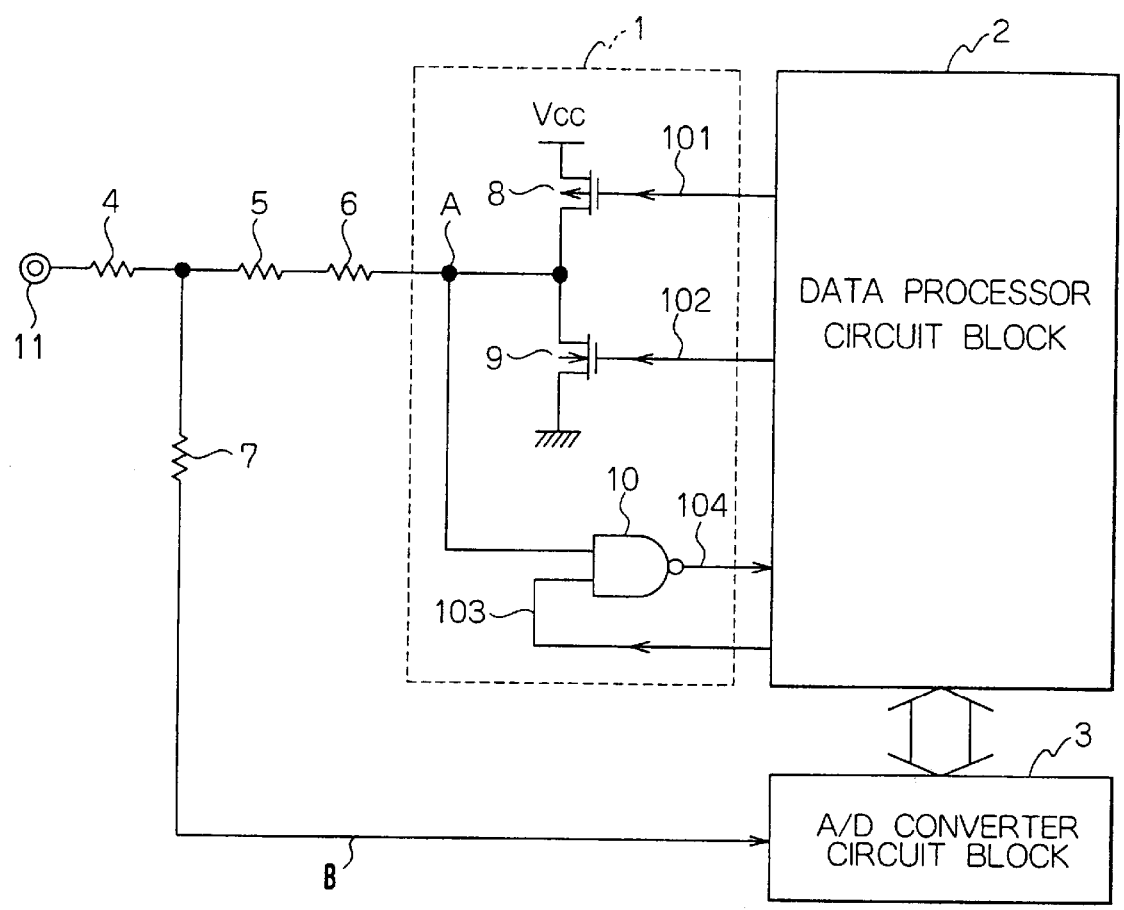
FIG. 1 is block diagram showing a configuration of a microcomputer according to a first embodiment of the present invention.

FIG. 1 is a block diagram showing a configuration of a microcomputer according to a first embodiment of the present invention. As shown in FIG. 1 the microcomputer of the first embodiment comprises: a data processor circuit block 2 and an A/D converter circuit block 3 constituting an internal circuit; an I/O circuit 1 having a P channel MOS transistor 8, an N channel MOS transistor 9, and a NAND circuit 10; an external terminal 11 shared by the I/O circuit 1 and the A/D converter circuit block 3; and resistor 6 provided on a wire connecting the external terminal 11 to the I/O circuit 1 and having a higher resistance value than a wire parasitic resistance. Wiring connecting the external terminal 11 to the I/O circuit 1 and to the A/D converter circuit block 3 has parasitic resistances 4, 5, and 7 explicitly depicted.

When the microcomputer shown in FIG. 1 executes a normal processing as a microcomputer for a data signal input from the external terminal 11, in the same way as the aforementioned conventional microcomputer, the data processor circuit block 2 outputs control signals 101 and 102 at "H" or "L" level to be supplied to gates of the P channel MOS transistor 8 and the N channel MOS transistor 9, respectively, so that the P channel MOS transistor 8 and the N channel MOS transistor 9 are both set to OFF state. Moreover, the data processor circuit block 2 outputs an input control signal 103 at "L" level for supply to the NAND circuit 10. The data signal from the external terminal 11 is affected by the ON/OFF state of the P channel MOS transistor 8 and the N channel MOS transistor 9 when supplied to the NAND circuit 10. In the NAND circuit, the data signal is AND-ed with the input control signal 103 at "L" level. A resultant signal is supplied as an LSI input signal 104 to the data processor circuit block 2, where the LSI input signal 104 is subjected to a predetermined data processing corresponding to the aforementioned data signal from the external terminal 11.

Moreover, when the microcomputer executes an A/D conversion, in the same way as in a conventional microcomputer, the data processor circuit block 2 outputs the control signal 101 at "H" level and the control signal 102 at "L" level which set both of the P channel MOS transistor 8 and the N channel MOS transistor 9 to OFF state to enter a cut-off state. Moreover, the NAND circuit 10 has an input impedance at open state. Accordingly, a data signal from the external terminal 11 to be subjected to an A/D conversion is supplied via the parasitic resistances 4 and 7 directly to the A/D converter circuit block 3, where a predetermined A/D conversion is executed. Here, the input control signal 103 from the data processor circuit block 2 is at "H" level when supplied to the NAND circuit 104. Accordingly, the data signal supplied via the parasitic resistances 4 and 5 and the resistor 6 is AND-ed in the NAND circuit, and the LSI input signal 104 is outputted always at "L" level for supply to the data processor circuit block 2.

As has been described above, in the semiconductor integrated circuit with a high integration, a noise from various noise sources causes an off-leak current in the I/O circuit 1, which in turn causes, with the parasitic resistances 4 and 5 and the resistor 6, to fluctuate the level value of the data signal supplied from the external terminal 11 to the A/D converter circuit block 3.

Suppose Vi is a voltage level of a data signal supplied to the external terminal 11; r4 and r5 are resistance values of the parasitic resistances 4 and 5; and α is a voltage fluctuation value at the node A caused by an off-leak current of the I/O circuit 1. For the voltage level $V_i$ of the data signal supplied to the external terminal 11, the data signal at the node B of the input terminal of the A/D converter circuit block 3 has a potential level $V_B$ that can be expressed as follows.

$$V_B = V_i + \alpha[r4/(r4+r5+R6)] \quad (2)$$

In the above Equation (2), the resistance value R6 of the resistor 6 is set at a sufficiently high value compared to values of the parasitic resistances r4 and r5. Accordingly, the above Equation (2) can be expressed approximately as follows.

$$V_B \approx [\text{nearly equal to}] V_i + \alpha(r4/R6) \quad (3)$$

$$\approx [\text{nearly equal to}] V_i \quad (4)$$

For example, if R6: r4=R6: r6=100:1, from the aforementioned Equation (1), the fluctuation voltage is α/2 in the conventional example. On the other hand, in the present embodiment, from the Equation (2), the fluctuation voltage is α/102, and further from the Equation (3), the fluctuation voltage is also α/102.

As is clear from the above Equations (2), (3), and (4), when the wiring connecting the external terminal 11 to the I/O circuit 1 has a resistor having a sufficiently high resistance value compared to a parasitic resistance, it is practically possible during an A/D conversion operation, to eliminate effects from potential fluctuation due to the parasitic resistance for the potential level of a data signal inputted to the external terminal 11. Thus, it is possible to prevent deterioration of the A/D conversion accuracy for the data signal.

In the first embodiment shown in FIG. 1, suppose that the off-leak current at the node A has a fluctuation potential of 100 mV, the parasitic resistances 4 and 5 are r4=r5=10Ω, and the resistor 6 has a resistance R6=1 kΩ. Then from Equation (3), the fluctuation voltage added to the potential level of the data signal at the input terminal of the A/D converter circuit block 3 is expressed as α/100=1 mV. On the other hand, in the conventional example under the same conditions, a fluctuation voltage at the input terminal of the A/D converter circuit block 3 is α/2=50 mV from Equation (1). That is, a deflection of 50 mV is generated in the voltage level supplied to the A/D converter circuit block 3, disabling to obtain a high-accuracy A/D converter characteristic.

Next, description will be directed to a second embodiment of the present invention.

Figure 2:
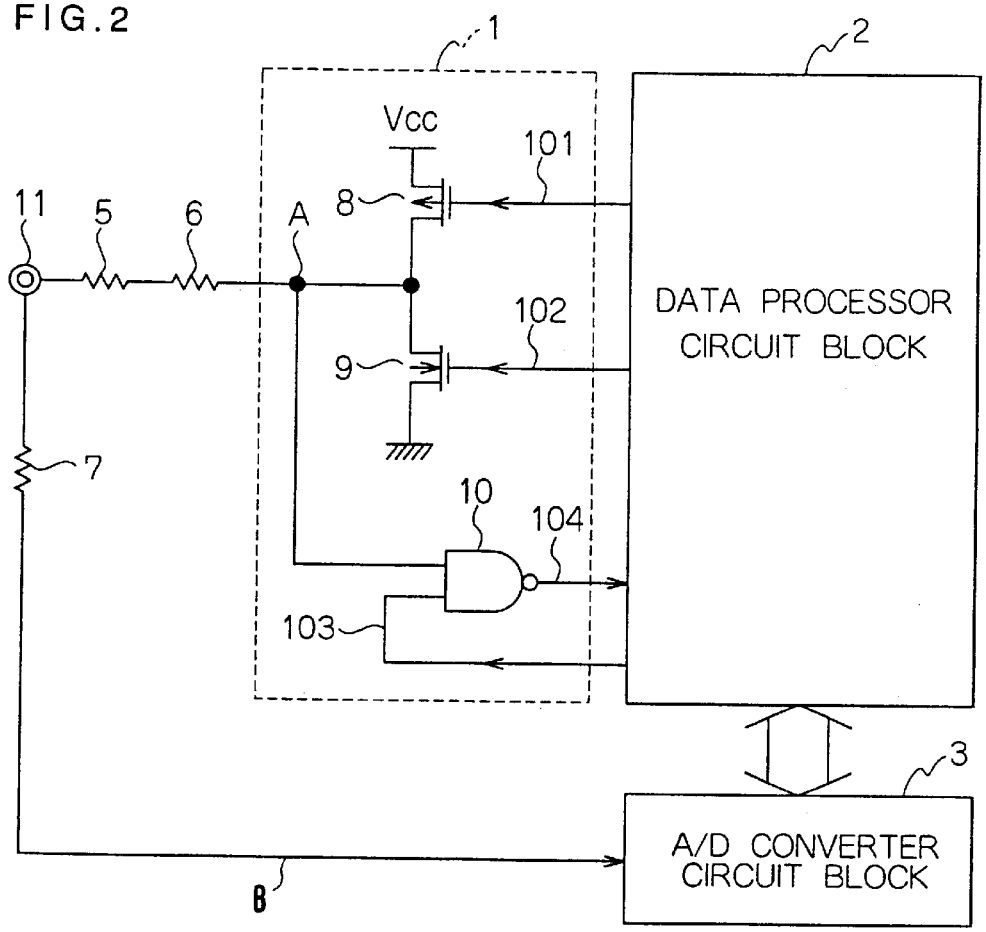
FIG. 2 is a block diagram showing a configuration of a microcomputer according to a second embodiment of the present invention.
Figure 3:
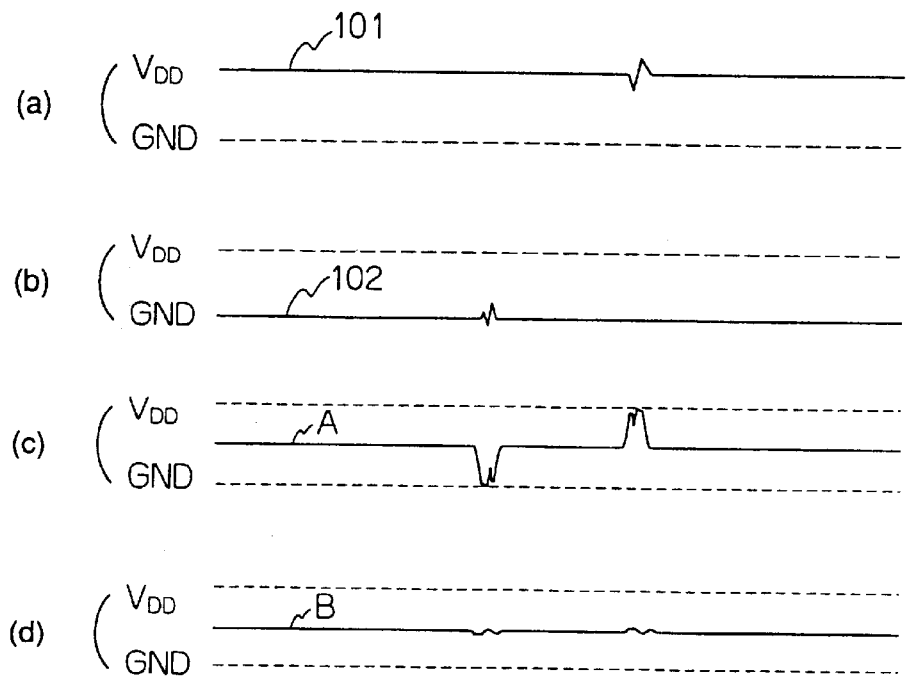
FIG. 3 shows operation timings in the microcomputer according to present invention.
Figure 4:
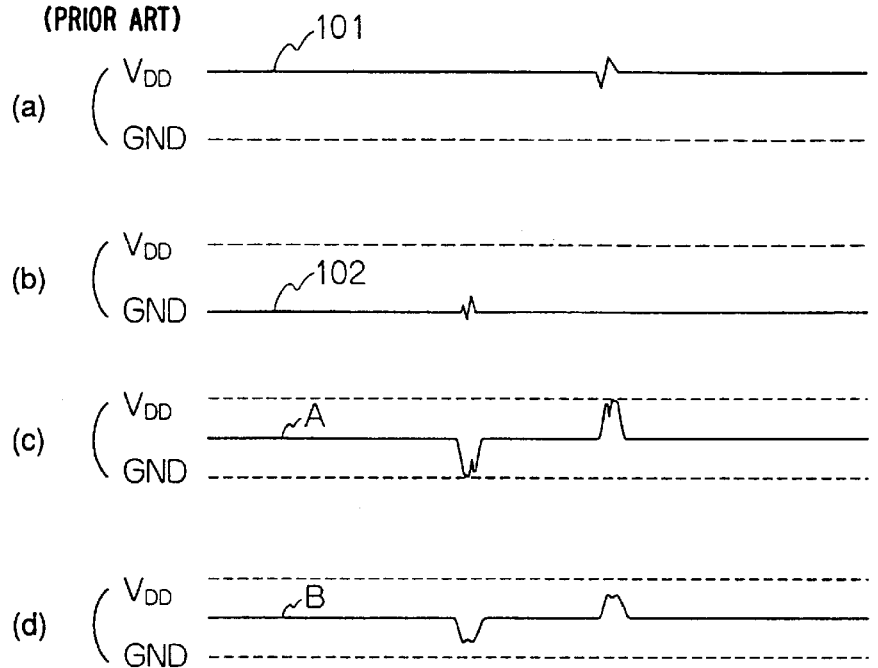
FIG. 4 shows operation timings chart showing in a conventional microcomputer.
Figure 5:
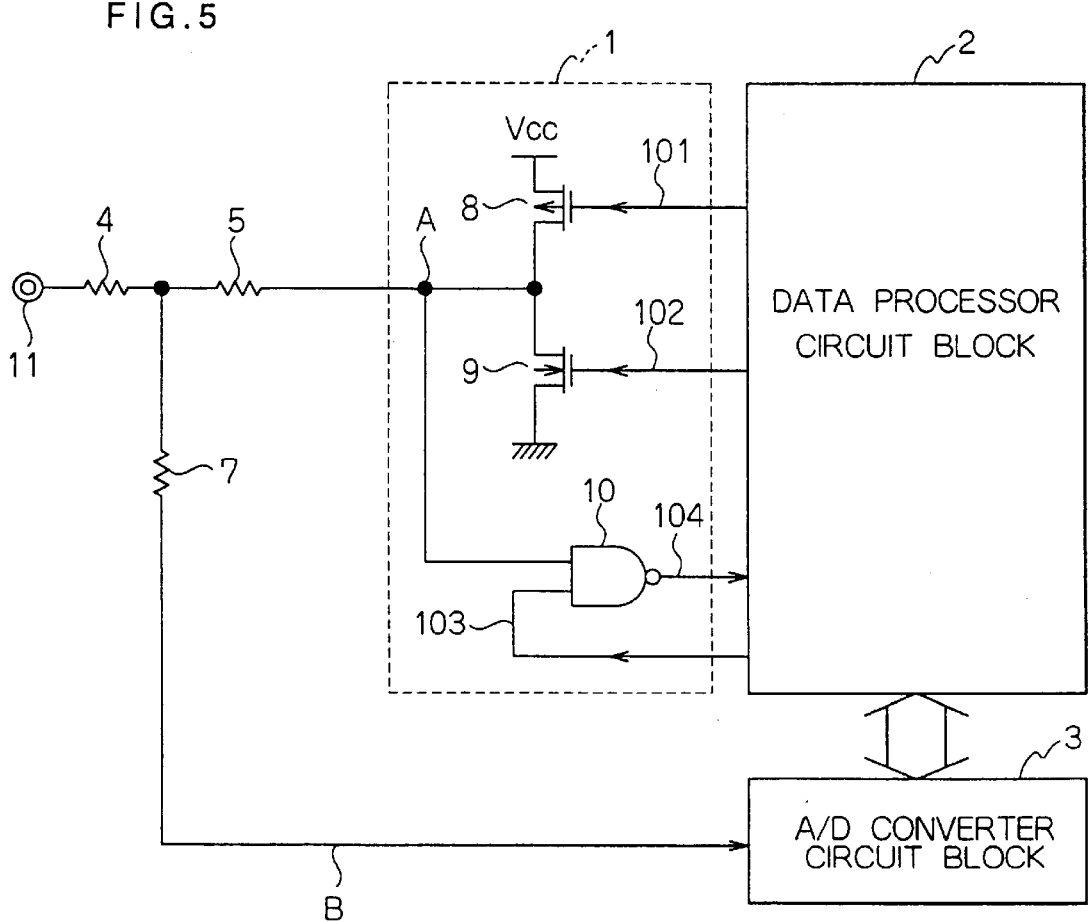
FIG. 5 is a block diagram showing a configuration of a conventional microcomputer.

FIG. 2 is a block diagram showing a configuration of a microcomputer according to the second embodiment that comprises: a data processor circuit block 2 and an A/D converter circuit block 3 constituting an internal circuitry; an I/O circuit 1 including a P channel MOS transistor 8, an N channel MOS transistor 9, and a NAND circuit 10; an external terminal 11 shared by the I/O circuit 1 and the A/D converter circuit block 3; and a resistor 6 provided on a wire connecting the external terminal 11 to the I/O circuit 1 and having a resistance sufficiently higher than a parasitic resistance. It should be noted that in the second embodiment, the wire connecting the external terminal 11 to the I/O circuit and the wire connecting the external terminal 11 to A/D converter circuit block 3 have parasitic resistances 5 and 7, respectively, as are explicitly depicted in the figure. Unlike the first embodiment, the external terminal 11 is directly connected to a semiconductor integrated circuit constituting the microcomputer, and the parasitic resistance 4 shown in FIG. 1 is ignored. Accordingly, the wire connecting the I/O circuit 1 to the A/D converter circuit block 3 is branched directly in the external terminal 11. In this second embodiment, the semiconductor integrated circuit has a parasitic resistance of only 4 and 7 (i.e., r4=0 in FIG. 1). As is clear from Equation (3), by inserting the resistor 6, it is possible to obtain an effect higher than the effect obtained in the first embodiment. Note that the operation of this microcomputer for a normal processing and the operation during an A/D conversion are identical in the first embodiment.

FIG. 4A, FIG. 4B, FIG. 4C, and FIG. 4D respectively show the control signals 101 and 102, potential at node A, and potential at node B in the present invention in the conventional example. From comparison of FIG. 3D to FIG. 4D, it is clear that in the present invention, the level fluctuation at the input terminal (node B) of the A/D converter circuit block 3 due to the potential fluctuation at node A is significantly suppressed is compared to the conventional example.

As has been described above, in the microcomputer having a built-in A/D converter circuit according to the present invention, an input terminal for A/D conversion is shared by an external terminal for input/output of the microcomputer, wherein a resistor having a sufficiently great resistance value is inserted on a wire connecting the external terminal to an I/O circuit corresponding to an internal circuit of the microcomputer. That is, the resistance value is greater than a parasitic resistance of the wire, so as to suppress the AID converter input voltage fluctuation due to an off-leak current of the I/O circuit, thus enabling to enhance the A/D conversion accuracy.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-317028 (Filed on Nov. 18th, 1997) including specification, claims, drawings and summary are incorporated herein by reference in its entirety.

What is claimed is:

1. A microcomputer comprising:
    an internal circuit having a data processing function;
    a built-in A/D converter circuit connected to said internal circuit;
    an I/O circuit connected to said internal circuit;
    an external terminal for input/output shared by an input terminal of said A/D converter circuit;
    a first branch wire connecting said external terminal via said I/O circuit to said internal circuit;
    a second branch wire connecting said external terminal to said A/D converter circuit, and
    a predetermined resistor inserted on said first branch wire connecting said external terminal to said I/O circuit and designed to have a sufficiently higher resistance than a parasitic resistance of said first branch wire.

2. A microcomputer as claimed in claim 1, said microcomputer further comprising a main wire provided between said external terminal and a branching point of said first branch wire and said second branch wire.

3. A microcomputer as claimed in claim 1, wherein said I/O circuit includes:
    a first-conductive field effect transistor (FET) having a source connected to a high-potential power source, a gate supplied with a first control signal from said internal circuit, and a drain connected to a terminal of said predetermined resistor;
    a second-conductive field effect transistor (FET) having a drain connected to said drain of said first-conductive FET, a gate supplied with a second control signal from said internal circuit, and a source connected to a low-potential power source; and
    a NAND circuit having a first input terminal connected to said terminal of said predetermined resistor, a second input terminal supplied with an input control signal from said internal circuit, and an output terminal connected to said internal circuit.

4. A microcomputer as claimed in claim 2, wherein said I/O circuit includes:
    a first-conductive field effect transistor (FET) having a source connected to a high-potential power source, a gate supplied with a first control signal from said internal circuit, and a drain connected to a terminal of said predetermined resistor;
    a second-conductive field effect transistor (FET) having a drain connected to said drain of said first-conductive FET, a gate supplied with a second control signal from said internal circuit, and a source connected to a low-potential power source; and
    a NAND circuit having a first input terminal connected to said terminal of said predetermined resistor, a second input terminal supplied with an input control signal from said internal circuit, and an output terminal connected to said internal circuit.

5. The microcomputer according to claim 1, wherein the predetermined resistor is designed to have a resistance value at least one hundred times the parasitic resistance of the first branch wire.

6. The microcomputer according to claim 2, wherein the predetermined resistor is designed to have a resistance value at least one hundred times the parasitic resistance of the first branch wire.

* * * * *